United States Patent [19]
Nogami et al.

[11] Patent Number: 5,800,926
[45] Date of Patent: Sep. 1, 1998

[54] COATING FILM HAVING WATER REPELLENCY AND LOW REFRACTIVE INDEX

[75] Inventors: Tatsuya Nogami; Takakazu Nakada; Rie Sakai; Takeshi Hosoya, all of Funabashi, Japan

[73] Assignee: Nissan Chemical Industries, Ltd., Tokyo, Japan

[21] Appl. No.: 749,558

[22] Filed: Nov. 15, 1996

[30] Foreign Application Priority Data

Dec. 1, 1995 [JP] Japan .................................. 7-313999

[51] Int. Cl.$^6$ .................. B32B 9/04; C03C 17/02
[52] U.S. Cl. .................. 428/447; 427/168; 427/169; 427/387; 428/429; 428/451; 528/26; 528/26.5; 528/42
[58] Field of Search .................. 428/447, 451, 428/429; 427/162, 168, 169, 384, 385.5, 387; 528/25, 26, 26.5, 29, 32, 38, 39, 42

[56] References Cited

U.S. PATENT DOCUMENTS

| | | | |
|---|---|---|---|
| 4,024,306 | 5/1977 | Takamizawa et al. | 427/387 |
| 4,549,003 | 10/1985 | Lim et al. | 528/42 |
| 4,687,707 | 8/1987 | Matsuo et al. | 428/336 |
| 5,394,269 | 2/1995 | Takamatsu et al. | 427/169 |

FOREIGN PATENT DOCUMENTS

| | | |
|---|---|---|
| 0 471 324 | 2/1992 | European Pat. Off. . |
| 0 543 410 | 5/1993 | European Pat. Off. . |
| 0 657 487 | 6/1995 | European Pat. Off. . |
| B-3-23493 | 3/1991 | Japan . |
| A-5-105424 | 4/1993 | Japan . |
| A-6-157076 | 6/1994 | Japan . |

*Primary Examiner*—D. S. Nakarani
*Attorney, Agent, or Firm*—Oblon, Spivak, McClelland, Maier & Neustadt, P.C.

[57] ABSTRACT

A coating film having a refractive index of from 1.28 to 1.38 and a contact angle of water of from 90° to 115°, adhered on a substrate surface, and prepared by reacting a particular tetraalkylsilicate, a particular fluorine-containing silicon compound, a particular hydroxy-containing compound, and oxalic acid in a particular range of ratios and in the absence of water, and under further specified reaction conditions.

18 Claims, No Drawings

COATING FILM HAVING WATER REPELLENCY AND LOW REFRACTIVE INDEX

The present invention relates to an improvement of a coating film formed on a substrate from a polymer solution of an alkoxy group-containing silicon compound. Particularly, the present invention relates to a coating film having a low refractive index and a large contact angle of water, which is formed as adhered on a substrate surface, by heat-curing on a substrate surface a coating composed of a polysiloxane solution prepared by co-condensing, in the absence of water, alkoxy group-containing silicon compounds having a specific composition.

It is known that when a coating film showing a refractive index lower than the refractive index of a substrate is formed on the surface of the substrate, the reflectance of light reflected from the surface of the coating film decreases. Such a coating film showing a decreased light reflectance is utilized as an antireflection film and practically applied to various substrate surfaces.

JP-A-5-105424 discloses a process for forming an antireflection film having a low refractive index, on a substrate, which comprises coating on a glass substrate such as a cathode ray tube an alcohol dispersion of fine particles of $MgF_2$ formed by reacting a magnesium salt or an alkoxy magnesium compound as a Mg source with a fluoride salt as a F source, or a liquid having tetraalkoxysilane or the like added thereto for improving the film strength, as a coating fluid, followed by heat-treatment at a temperature of from 100° to 500° C.

JP-A-6-157076 discloses a low reflection glass having formed on a glass substrate a thin film showing a refractive index of from 1.21 to 1.40 and having a thickness of from 60 to 160 nm with irregularities or micro-pits having a diameter of from 50 to 200 nm, by mixing a solvent such as an alcohol with at least two hydrolytic polycondensates different in the average molecular weight, such as tetraalkoxysilane, methytrialkoxysilane and ethyltrialkoxysilane, to obtain a coating fluid, forming a coating film from such a coating fluid by controlling the relative humidity and the mixing ratio at the time of the above mixing, and heating the coating film.

JP-B-3-23493 discloses a low reflectance glass comprising a glass, a lower layer film having a high refractive index formed on its surface and an upper layer film having a low refractive index formed on the surface thereof. As a detailed description of the process for forming the upper layer film, this publication discloses a process which comprises hydrolyzing a fluorine-containing silicon compound having a polyfluorocarbon chain, such as $CF_3(CF_2)_2C_2H_4Si(OCH_3)_3$, and a silane coupling agent such as $Si(OCH_3)_4$ in an amount of from 5 to 90 wt % based thereon, in an alcohol solvent in the presence of a catalyst such as acetic acid, followed by filtration to obtain a liquid of a co-condensate, then coating this liquid on the lower layer film and heating it at a temperature of from 120° to 250° C.

The process for forming a multilayer coating film on a substrate as disclosed in the above JP-B-3-23493, requires repetition of the coating and baking steps, and is not efficient. Besides, due to repetition of the baking step, cracks are likely to form in the coating film, the resulting coating film tends to be non-uniform, and deformation of the substrate is likely to occur. Further, in order to impart a low refractive index to the upper layer film formed from the coating fluid obtained by such a hydrolytic method, it is required to use a large amount of the fluorine-containing silicon compound at a level of at least 1.1 mol per mol of the silane coupling agent, and even in such a case, a coating film having a refractive index lower than 1.33 is hardly obtainable. Further, if the coating fluid obtained by such a hydrolytic method, is directly coated on the substrate, and the coating is heated, the resulting coating film, will not have sufficient hardness.

By the process disclosed in the above JP-A-5-105422, the bond strength among the fine particles of $MgF_2$ is weak, so that the formed coating film is poor in the mechanical strength, and the adhesive strength to the substrate is inadequate. Besides, this coating film made of $MgF_2$ does not essentially show a refractive index lower than 1.38, and depending upon the type of the substrate, no adequate antireflection property can be obtained.

The process disclosed in the above JP-A-6-157076 is cumbersome in the preparation and incorporation of the polycondensates having different molecular weights and further requires control of the relative humidity during the film-forming and the surface irregularities of the coating film. Thus, this process is not practically useful.

Each of the coating films disclosed in the above JP-A-5-105422 and JP-A-6-157076 is susceptible to staining of its surface during practical use, and to prevent such staining, it has been common to coat a treating agent having higher water repellency on its surface, such as a stain-proofing agent made of a fluorine-containing compound.

It is an object of the present invention to provide a process for forming an improved coating film on a substrate simply and efficiently. Particularly, the present invention is intended to provide a coating film formed on a substrate as adhered to the surface of the substrate and having a refractive index of from 1.28 to 1.38 and a contact angle of water of from 90° to 115°.

Namely, the present invention provides a process for forming a coating film on a substrate surface, which comprises preparing a reaction mixture comprising a silicon compound (A) of the following formula (1):

$$Si(OR)_4 \qquad (1)$$

wherein R is a $C_{1-5}$ alkyl group, a silicon compound (B) of the following formula (2):

$$CF_3(CF_2)_nCH_2CH_2Si(OR^1)_3 \qquad (2)$$

wherein $R^1$ is a $C_{1-5}$ alkyl group, and n is an integer of from 0 to 12, an alcohol (C) of the following formula (3):

$$R^2CH_2OH \qquad (3)$$

wherein $R^2$ is a hydrogen atom, or an unsubstituted or substituted $C_{1-12}$ alkyl group, and oxalic acid (D), in a ratio of from 0.05 to 0.43 mol of the silicon compound (B) per mol of the silicon compound (A), in a ratio of from 0.5 to 100 mol of the alcohol (C) per mol of the total alkoxy groups contained in the silicon compounds (A) and (B), and in a ratio of from 0.2 to 2 mol of the oxalic acid (D) per mol of the total alkoxy groups contained in the silicon compounds (A) and (B); heating this reaction mixture at a temperature of from 50° to 180° C. until the total amount of the silicon compounds (A) and (B) remaining in the reaction mixture becomes at most 5 mol%, while maintaining a $SiO_2$ concentration of from 0.5 to 10 wt % as calculated from silicon atoms in the reaction mixture and maintaining absence of water, to form a polysiloxane solution; then coating a coating fluid comprising the polysiloxane solution on a substrate surface to form a coating; and heat-curing the coating at a temperature of from 80° to 450° C. to form a coating film having a refractive index of from 1.28 to 1.38 and a contact angle of water of from 90° to 115°, as adhered on the substrate surface; and such a coating film formed by the process.

The above polysiloxane solution is transparent and contains no polysiloxane of gel form. Although a large amount of the alcohol (C) and a relatively large amount of oxalic acid (D) are coexistent, since the silicon compounds (A) and (B) are heated in a reaction mixture in the absence of water, this polysiloxane is not the one formed by condensation of hydrolyzates of the silicon compounds (A) and (B). When a polysiloxane is formed from an alkoxysilane by a method of hydrolysis in an alcohol solvent, the liquid tends to be turbid, or a non-uniform polysiloxane is likely to form, as the hydrolysis proceeds. With the above reaction mixture of the present invention, no such phenomenon will take place.

The chemical structure of the polysiloxane of the present invention is complex and can not be specifically defined. However, it is considered that a co-condensate polysiloxane of the silicon compounds (A) and (B) having a degree of polymerization suitable for forming a solution and having a relatively uniform structure, will form, even though it may have a branched structure, as polymerization proceeds, probably as the alcohol (C) acts on an intermediate formed by the reaction of the silicon compounds (A) and (B) with oxalic acid (D).

By heating the coating containing the above polysiloxane solution, coated on the substrate, removal of volatile components from the coating and a curing reaction of polysiloxane in the coating will proceed, whereby an insoluble coating film adhered to the substrate surface and having a low refractive index and water repellency, will form. The larger the molar ratio of the silicon compound (B) to the silicon compound (A), the lower the refractive index of this coating film, and the larger the contact angle with water. However, as is different from the upper layer film disclosed in the above JP-B-3-23493, the coating film of the present invention has a refractive index lower than the refractive index of the above upper layer film, in spite of the fact that it is formed from a coating fluid having a low content of the silicon compound (B).

Now, the present invention will be described in detail with reference to the preferred embodiments.

Examples of the alkyl group R in the above formula (1) include methyl, ethyl, propyl, butyl and pentyl. Preferred examples of the silicon compound (A) include tetramethoxysilane, tetraethoxysilane, tetrapropoxysilane and tetrabutoxysilane. Among them, particularly preferred are tetramethoxysilane and tetraethoxysilane. These compounds may be used alone or in combination as a mixture of two or more of them.

Examples of the alkyl group $R^1$ in the above formula (2) include methyl, ethyl, propyl, butyl and pentyl. Preferred examples of the silicon compound (B) include trifluoropropyltrimethoxysilane, trifluoropropyltriethoxysilane, tridecafluorooctyltrimethoxysilane, tridecafluorooctyltriethoxysilane, heptadecafluorodecyltrimethoxysilane and heptadecafluorodecyltriethoxysilane. These compounds may be used alone or in combination as a mixture of two or more of them.

Examples of the unsubstituted alkyl group $R^2$ in the above formula (3) include methyl, ethyl, propyl, butyl, pentyl, hexyl, heptyl and octyl. Examples of the substituted alkyl group $R^2$ includes hydroxymethyl, methoxymethyl, ethoxymethyl, hydroxyethyl, methoxyethyl and ethoxyethyl. Preferred examples of the alcohol (C) include methanol, ethanol, propanol, n-butanol, ethylene glycol monomethyl ether, ethylene glycol monoethyl ether, diethylene glycol monomethyl ether, diethylene glycol monoethyl ether, propylene glycol monomethyl ether and propylene glycol monoethyl ether. Among them, particularly preferred is ethanol.

A uniform polysiloxane solution is hardly obtainable from a reaction mixture in which the silicon compound (B) is used in an amount exceeding 0.43 mol per mol of the silicon compound (A). From a reaction mixture wherein the silicon compound (B) is used in an amount of less than 0.05 mol per mol of the silicon compound (A), a coating film having a refractive index of 1.38 or less will hardly be formed, and the coating film thereby formed will not exhibit water repellency showing a contact angle of water of at least 90°. It is particularly preferred that the silicon compound (B) is used in an amount of from 0.05 to 0.25 mol per mol of the silicon compound (A).

If the alcohol (C) is used in an amount smaller than 0.5 mol per mol of the total alkoxy groups contained in the silicon compounds (A) and (B), it takes a long time to form the polysiloxane, and it tends to be difficult to form a coating film having high hardness from the liquid containing the polysiloxane thereby obtained. On the other hand, if the alcohol (C) is used in an amount larger than 100 mol per mol of the total alkoxy groups contained in the silicon compounds (A) and (B), the $SiO_2$ concentration in the obtained polysiloxane-containing liquid tends to be inadequate, and concentration will be required prior to coating, such being inefficient. It is particularly preferred to use the alcohol (C) in an amount of from 1 to 50 mol per mol of the total alkoxy groups contained in the silicon compounds (A) and (B).

If oxalic acid (D) is used in an amount smaller than 0.2 mol per mol of the total alkoxy groups contained in the silicon compounds (A) and (B), it tends to be difficult to form a coating film having high hardness from the resulting polysiloxane-containing liquid. On the other hand, if the oxalic acid (D) is used in an amount larger than 2 mol per mol of the total alkoxy groups contained in the silicon compounds (A) and (B), the resulting polysiloxane-containing liquid contains a relatively large amount of the oxalic acid (D), and from such a liquid, it tends to be difficult to obtain a coating film having the desired properties. It is particularly preferred to use the oxalic acid (D) in an amount of from 0.25 to 1 mol per mol of the total alkoxy groups contained in the silicon compounds (A) and (B).

To form the reaction mixture, an alkylalkoxysilane may be incorporated as a modifier (E), for example, in an amount of 0.02 to 0.2 mol per mol of the silicon compound (A), as the case requires, in addition to the silicon compounds (A) and (B), the alcohol (C) and the oxalic acid (D).

Preferred examples of the modifier (E) include trialkoxysilanes such as methyltrimethoxysilane, methytriethoxysilane, ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane, octadecyltriethoxysilane, phenyltrimethoxysilane, phenyltriethoxysilane, vinyltrimethoxysilane, vinyltriethoxysilane, γ-aminopropyltrimethoxysilane, γ-aminopropyltriethoxysilane, γ-glycidoxypropyltrimethoxysilane, γ-glycidoxypropyltriethoxysilane, γ-methacryloxypropyltrimethoxysilane and γ-methacryloxypropyltriethoxysilane, and dialkoxysilanes such as dimethyldimethoxysilane and dimethyldiethoxysilane. Such a modifier (E) is capable of lowering the temperature for curing the coating on the substrate and improves the adhesion of the coating film to the substrate.

The reaction mixture comprising the silicon compounds (A) and (B), the alcohol (C) and the oxalic acid (D), may be formed by mixing such components, or by further incorporating the above modifier (E) thereto. To such a reaction mixture, no water may be added. This reaction mixture is preferably heated in the form of a solution. For example, it is preferably heated as a reaction mixture in the form of a solution obtained by preliminarily adding the oxalic acid (D) to the alcohol (C) to form an alcohol solution of oxalic acid and then mixing the silicon compounds (A) and (B) and the above modifier (E) to the solution. The reaction mixture comprising the silicon compound (A), the silicon compound (B), the alcohol (C) and the oxalic acid (D) in the above-mentioned ratios, usually has a $SiO_2$ concentration of from 0.5 to 10 wt % when silicon atoms contained therein are calculated as $SiO_2$. Also in the case of the reaction mixture containing the above modifier (E), such a modifier (E) is incorporated so that the mixture will have a $SiO_2$ concentration of from 0.5 to 10 wt % when silicon atoms contained therein are calculated as $SiO_2$. Such a reaction mixture is maintained at the above $SiO_2$ concentration and in the absence of water during the heating of the reaction mixture. This heating can be carried out in a usual reactor at a liquid temperature of from 50° to 180° C. Preferably, it is carried out, for example, in a closed container or under reflux, so that no evaporation or volatilization of the liquid from the reactor occurs.

If the heating to form the polysiloxane is carried out at a temperature lower than 50° C., the liquid tends to have turbidity or tends to contain insoluble substances. Therefore, this heating is carried out at a temperature higher than 50° C. If the temperature is high, the operation can be completed in a short period of time. However, heating at a temperature higher than 180° C. is inefficient, as no additional merits will be thereby obtained. The heating time is not particularly limited. For example, it is usually about 8 hours at 50° C and about 3 hours under reflux at 78° C. Usually, the heating is terminated when the amount of the remaining silicon compounds (A) and (B) becomes at most 5 mol %, based on the total charged amount of the silicon compounds (A) and (B). If a polysiloxane-containing liquid in which these silicon compounds remain more than 5% based on the total amount of the silicon compounds (A) and (B) charged, is coated on a substrate surface and then the coating is heat-cured at a temperature of from 80° to 450° C., the resulting coating film tends to have pinholes, or it tends to be difficult to obtain a coating film having adequate hardness.

The polysiloxane solution obtained by the above heating, may be used directly as a coating fluid for the next coating step. However, if desired, it may be concentrated or diluted to obtain a solution useful as a coating fluid, or the solvent may be substituted by other solvent to obtain a solution useful as a coating fluid. Otherwise, an optional additive (F) may be added thereto to obtain a coating fluid. Examples of such an additive (F) include a silica sol, an alumina sol, a titania sol, a zirconia sol, a magnesium fluoride sol and a ceria sol, which are in the form of sols of colloidal inorganic fine particles. These sols may be used alone or in combination as a mixture of two or more of them. Such sols are preferably organo sols. Particularly preferred are organo sols using the alcohol (C) as the dispersing medium. The amount of the sol to be added, may be selected optionally, so long as the amount of colloidal inorganic fine particles is at most 70 wt %, based on the total weight of the heat cured solid content in the coating fluid. As other additives (F), metal salts or metal compounds may, for example, be mentioned. These additives are suitable for controlling the water repellency of the coating film.

The coating fluid to be used in the coating step, is preferably a fluid which contains from 0.5 to 10 wt %, as calculated as $SiO_2$, of silicon atoms derived from the above polysiloxane transparent solution. If this $SiO_2$ concentration is less than 0.5%, the thickness of the coating film formed by one coating operation tends to be thin. If the concentration exceeds 10 wt %, the storage stability of such a coating fluid tends to be inadequate. It is particularly preferred that the $SiO_2$ concentration of this coating fluid is from 2 to 8 wt %.

The substrate is not particularly limited so long as it permits formation of an adhesive coating film thereon. In order to form an antireflection coating film thereon, it is preferred to use a substrate having refractive index higher the refractive index of the coating film, such as usual glass or plastics.

The above polysiloxane solution or a coating fluid comprising such a solution, can be coated on the substrate by a conventional method such as a dipping method, a spin coating method, a brush coating method, a roll coating method or a flexo printing method.

The coating formed on the substrate may directly be heat-cured. However, prior to such heat-curing, it may be dried at a temperature of from room temperature to 80° C., preferably from 50° to 80° C., and then heated at a temperature of from 80° to 450° C., preferably from 100° to 450° C. The time for this heating may be from 5 to 60 minutes for adequate heat-curing. If this heating temperature is lower than 80° C., the hardness, chemical resistance or the like of the resulting coating film tends to be inadequate. In the case of a heat resistant substrate such as glass, heating may usually be carried out at a temperature of at least 300° C. However, at a temperature higher than 450° C., no adequate water repellency tends to be imparted to the resulting coating film. Such heating can be carried out by a conventional method, for example, by using a hot plate, an oven or a belt furnace.

Now, the present invention will be described in further detail with reference to Examples. However, it should be understood that the present invention is by no means restricted to such specific Examples.

EXAMPLE 1

70.8 g of ethanol was charged into a four-necked flask equipped with a reflux condenser, and 12.0 g of oxalic acid was gradually added to this ethanol with stirring, to prepare an ethanol solution of oxalic acid. Then, this solution was heated to its reflux temperature, and a mixture comprising 11.0 g of tetraethoxysilane and 6.2 g of tridecafluorooctyltrimethoxysilane, was dropwise added to this solution under reflux. After completion of the dropwise addition, heating was continued for 5 hours under reflux, followed by cooling to obtain a polysiloxane solution ($L_1$).

This solution ($L_1$) was analyzed by gas chromatography, whereby no alkoxide monomer was detected. This solution ($L_1$) was coated on the surface of a calcium fluoride substrate, and then, the coating was heated at 300° C. for 30 minutes to form a coating film adhered to the surface of this calcium fluoride substrate. Then, with respect to this coating film, the spectrum of transmitted light was measured by means of an infrared spectroscope, whereby absorption by a silanol group was observed in the vicinity of 3,200 cm$^{-1}$ and 980 cm$^{-1}$, absorption by a methylene group was observed in the vicinity of 2,800 cm$^{-1}$, absorption by Si—O—Si was observed in the vicinity of 1,100 cm$^{-1}$, and absorption by C—F was observed in the vicinity of 1,200 cm$^{-1}$.

EXAMPLE 2

72.4 g of ethanol was charged into a four-necked flask equipped with a reflux condenser, and 12.0 g of oxalic acid was gradually added to this ethanol with stirring, to prepare an ethanol solution of oxalic acid. Then, this solution was heated to its reflux temperature, and a mixture comprising 12.5 g of tetraethoxysilane and 3.1 g of tridecafluorooctyltrimethoxysilane, was dropwise added to this solution under reflux. After completion of the dropwise addition, heating was continued for 5 hours under reflux, followed by cooling to obtain a polysiloxane solution (L$_2$). This solution (L$_2$) was analyzed by gas chromatography, whereby no alkoxide monomer was detected.

EXAMPLE 3

70.6 g of ethanol was charged into a four-necked flask equipped with a reflux condenser, and 12.0 g of oxalic acid was gradually added to this ethanol with stirring, to prepare an ethanol solution of oxalic acid. Then, this solution was heated to its reflux temperature, and a mixture comprising 9.4 g of tetraethoxysilane, 6.2 g of tridecafluorooctyltrimethoxysilane, 1.2 g of γ-glycidoxypropyltrimethoxysilane and 0.6 g of γ-aminopropyltrimethoxysilane, was dropwise added to this solution under reflux. After completion of the dropwise addition, heating was continued for 5 hours under reflux, followed by cooling to obtain a polysiloxane solution (L$_3$). This solution (L$_3$) was analyzed by gas chromatography, whereby no alkoxide monomer was detected.

EXAMPLE 4

149 g of ethanol and 51.0 g of a methanol-dispersed silica sol containing colloidal silica having a particle size of 8 nm in an amount of 15.7 wt % as SiO$_2$, were added to 100 g of the solution (L$_3$) obtained in Example 3, followed by mixing thoroughly, to obtain a polysiloxane solution (L$_4$).

EXAMPLE 5

223.6 g of ethanol and 76.4 g of a methanol-dispersed silica sol containing colloidal silica having a particle size of 8 nm in an amount of 15.7 wt % as SiO$_2$, were added to 100 g of the solution (L$_3$) obtained in Example 3, followed by mixing thoroughly, to obtain a polysiloxane solution (L$_5$).

Comparative Example 1

Into a four-necked flask equipped with a reflux condenser, 43.7 g of ethanol, 16.6 g of tetraethoxysilane and 9.3 g of tridecafluorooctyltrimethoxysilane were charged and mixed to obtain an ethanol solution. Then, this solution was heated to its reflux temperature, and a mixture comprising 24.9 g of ethanol, 5.4 g of water and 0.1 g of nitric acid as a catalyst, was dropwise added to this solution under reflux. After completion of the dropwise addition, heating was continued for 5 hours under reflux, followed by cooling to obtain a liquid (L$_6$) comprising hydrolyzates of the alkoxysilanes.

Comparative Example 2

Into a four-necked flask equipped with a reflux condenser, 72.0 g of ethanol was charged, and 11.4 g of oxalic acid was gradually added to this ethanol with stirring, to prepare an ethanol solution of oxalic acid. Then, this solution was heated to its reflux temperature, and a mixture comprising 11.0 g of tetraethoxysilane and 5.6 g of octadecyltrimethoxysilane, was dropwise added to this solution under reflux. After completion of the dropwise addition, heating was continued for 5 hours, followed by cooling to obtain a polysiloxane-containing liquid (L$_7$).

Comparative Example 3

Into a four-necked flask equipped with a reflux condenser, 53.7 g of ethanol and 20.8 g of tetraethoxysilane were charged and mixed to prepare an ethanol solution of tetraethoxysilane. Then, this solution was heated to its reflux temperature, and a mixture comprising 20.0 g of ethanol, 5.4 g of water and 0.1 g of nitric acid as a catalyst, was dropwise added to this solution under reflux. After completion of the dropwise addition, heating was continued for 5 hours at a reflux temperature, followed by cooling to obtain a liquid comprising a hydrolyzate of the alkoxysilane. Then, to the entire amount of this liquid, 700 g of ethanol and 100 g of a methanol-dispersed silica sol containing colloidal silica having a particle size of 12 nm in an amount of 30 wt % as SiO$_2$, were added and thoroughly mixed, to obtain a mixed liquid (L$_8$).

EXAMPLE 6

Each of the above liquids (L$_1$) to (L$_8$) was used as a coating fluid and spin-coated on a substrate to form a coating, and then this coating was dried on a hot plate at 80° C. for 5 minutes, followed by heating at a temperature identified in Table 1 in a baking furnace, to form a coating film on the substrate surface. Then, with respect to each coating film thus obtained, the pencil hardness, the refractive index, the reflectance, the contact angle of water and the film thickness were measured by the following methods.

For the measurements of the pencil hardness and the reflectance, the coating film was formed on the surface of a soda lime glass substrate having a refractive index of 1.52 and a reflectance of from 4 to 5%, and for the measurement of the refractive index, the coating film was formed on the surface of a silicon substrate.

Method for measuring pencil hardness: In accordance with the method prescribed in JIS K5400.

Method for measuring refractive index: Using Ellipsometer DVA-36L, manufactured by Mizojiri Kogaku K.K., the refractive index of light with a wavelength of 633 nm was measured.

Method for measuring reflectance: Using spectrophotometer UV 3,100 PC, manufactured by Shimadzu Corporation, the reflectance of light with a wavelength of 550 nm was measured at an angle of incidence of 5°.

Method for measuring contact angle of water: Using an automatic contact angle meter CA-Z model, manufactured by Kyowa Kaimen Kagaku K.K., the contact angle when 3 μl of pure water was dropped, was measured.

Method for measuring film thickness: The coating after drying, was cut by a cutter and then heat-cured to obtain a coating film, and with respect to the coating film, the film thickness was measured by measuring the difference in level by means of a Talystep, manufactured by Rank Taylor Hobson Company.

The results of these measurements are shown in Table 1.

TABLE 1

| Coating fluid | Curing temperature (°C.) | Film thickness (nm) | Pencil hardness | Refractive index | Reflectance (%) | Contact angle of water (°) |
|---|---|---|---|---|---|---|
| $L_1$ | 300 | 100 | 7H | 1.36 | 1.2 | 105 |
| $L_1$ | 350 | 98 | 8H | 1.35 | 0.9 | 104 |
| $L_1$ | 450 | 98 | 8H | 1.32 | 0.8 | 105 |
| $L_1$ | 550 | 95 | 8H | 1.39 | 1.5 | 10 or less |
| $L_2$ | 300 | 105 | 8H | 1.38 | 1.5 | 100 |
| $L_3$ | 100 | 97 | 7H | 1.38 | 1.5 | 105 |
| $L_4$ | 100 | 110 | 6H | 1.35 | 1.1 | 103 |
| $L_5$ | 300 | 90 | 7H | 1.29 | 0.6 | 100 |
| $L_6$ | 300 | 100 | 7H | 1.42 | 2.3 | 95 |
| $L_7$ | 300 | 100 | 7H | 1.43 | 2.3 | 80 |
| $L_7$ | 350 | 95 | 8H | 1.42 | 2.3 | 30 |
| $L_7$ | 450 | 93 | 8H | 1.42 | 2.3 | 10 or less |
| $L_8$ | 300 | 110 | 7H | 1.33 | 0.9 | 10 or less |

As shown in Table 1, when the coating of the coating fluid ($L_1$) was heated at a temperature of 300° C., 350° C. or 450° C., the coating film of the present invention was obtained. Whereas, when the coating of the coating fluid ($L_1$) was heated at 550° C., a coating film of a Comparative Example was formed which had a contact angle of water of 10° or less and a refractive index of 1.39.

Each of the coating films obtained by heating the coating fluid ($L_2$) at 300° C., the coating fluid ($L_3$) at 100° C., the coating fluid ($L_4$) at 100° C. and the coating fluid ($L_5$) at 300° C., respectively, was excellent.

Each of the coating films obtained by heating at 300° C., the coatings of the comparative coating fluid ($L_6$) obtained by hydrolysis and the comparative coating fluid ($L_7$) prepared without using the silicon compound (B), respectively, failed to show a refractive index of 1.38 or less.

The coating film formed by heating at 300° C. the comparative coating fluid ($L_8$) containing the hydrolyzate of tetraalkoxysilane and the colloidal silica, showed a refractive index of 1.33, but had a contact angle of water of 10° or less.

The polysiloxane solution used for forming the coating film of the present invention has a stability durable for storage of about 6 months at normal temperature and thus can be presented as an industrial product. The coating film of the present invention can readily be obtained by a step of coating on a substrate surface a coating fluid comprising this solution of industrial product and a step of heat-curing the coating thereby formed.

By forming the coating film of the present invention on a substrate having a refractive index higher than the refractive index of the coating film of the present invention, such as on the surface of usual glass, this substrate can readily be converted to an antireflecting substrate. The thickness of the coating film of the present invention can be controlled by the thickness of the coating, but it may readily be controlled by adjusting the $SiO_2$ concentration in the coating fluid. The coating film of the present invention may be effectively used as a single coating film on the substrate surface, but it may be used also as an upper layer coating film on a lower layer coating film having a high refractive index.

It is known that between the thickness d (nm) of the coating film having a refractive index a and the wavelength λ (nm) of light, of which reduction in reflectance by this coating film, is desired, there is a relation represented by the formula d=(2b−1)λ/4a, wherein b is an integer of at least 1.

Accordingly, by determining the thickness of the coating film using this formula, it is readily possible to prevent reflection of a desired light. For example, prevention of reflection from a glass surface of a light having a center wavelength of visible light of 550 nm by a coating film having a refractive index of 1.32, can readily be accomplished by employing a coating film thickness of 104 nm which is obtainable by substituting these numerical values for λ and a in the above formula and 1 for b, or a coating film thickness of 312 nm which is likewise obtainable by substituting 2 for b.

The coating film of the present invention may be applied to the surface of various products for which antireflection of light is desired, including cathode ray tubes made of glass, displays for computers, mirrors having glass surface and show cases made of glass. The coating film of the present invention also has excellent water repellency, and by forming this coating film on a hydrophilic substrate surface, the hydrophilic substrate surface susceptible to staining can be converted to a stainproof surface.

What is claimed is:

1. A process for forming a coating film on a substrate surface, which comprises preparing a reaction mixture comprising a silicon compound (A) of the following formula (1):

$$Si(OR)_4 \qquad (1)$$

wherein R is a $C_{1-5}$ alkyl group, a silicon compound (B) of the following formula (2):

$$CF_3(CF_2)nCH_2CH_2Si(OR^1)_3 \qquad (2)$$

wherein $R^1$ is a $C_{1-5}$ alkyl group, and n is an integer of from 0 to 12, an alcohol (C) selected from the group consisting of diethylene glycol monomethyl ether, diethylene glycol monoethyl ether and an alcohol of the following formula (3):

$$R^2CH_2OH \qquad (3)$$

wherein $R^2$ is a hydrogen atom, or an unsubstituted $C_{1-12}$ alkyl group or a $C_{1-12}$ alkyl group substituted with hydroxy, methoxy or ethoxy, and oxalic acid (D), in a ratio of from 0.05 to 0.43 mol of the silicon compound (B) per mol of the silicon compound (A), in a ratio of from 0.5 to 100 mol of the alcohol (C) per mol of the total alkoxy groups contained in the silicon compounds (A) and (B), and in a ratio of from 0.2 to 2 mol of the oxalic acid (D) per mol of the total alkoxy groups contained in the silicon compounds (A) and (B); heating this reaction mixture at a temperature of from 50° to 180° C. until the total amount of the silicon compounds (A) and (B) remaining in the reaction mixture becomes at most 5 mol %, while maintaining a $SiO_2$ concentration of from 0.5 to 10 wt % as calculated from silicon atoms in the reaction mixture and maintaining absence of water, to form a polysiloxane solution; then coating a coating fluid comprising the polysiloxane solution on a substrate surface to form a coating; and heat-curing the coating at a temperature of from 80° to 450° C. to form a coating film having a refractive index of from 1.28 to 1.38 and a contact angle of water of from 90° to 115°, as adhered on the substrate surface.

2. The process according to claim 1, wherein the silicon compound (A) is at least one silicon compound selected from the group consisting of tetramethoxysilane, tetraethoxysilane, tetrapropoxysilane and tetrabutoxysilane.

3. The process according to claim 1, wherein the silicon compound (A) is at least one silicon compound selected from the group consisting of tetramethoxysilane and tetraethoxysilane.

4. The process according to claim 1, wherein the silicon compound (B) is at least one silicon compound selected from the group consisting of 3,3,3-trifluoropropyltrimethoxysilane, 3,3,3-trifluoropropyltriethoxysilane, 8,8,8,7,7,6,6,5,5,4,4,3,3-tridecafluorooctyltrimethoxysilane, 8,8,8,7,7,6,6,5,5,4,4,3,3-tridecafluorooctyltriethoxysilane, 10,10,10,9,9,8,8,7,7,6,6,5,5,4,4,3,3-heptadecafluorodecyltrimethoxysilane and 10,10,10,9,9,8,8,7,7,6,6,5,5,4,4,3,3-heptadecafluorodecyltriethoxysilane.

5. The process according to claim 1, wherein the alcohol (C) is at least one alcohol selected from the group consisting of methanol, ethanol, propanol, n-butanol, ethylene glycol monomethyl ether, ethylene glycol monoethyl ether, diethylene glycol monomethyl ether, diethylene glycol monoethyl ether, propylene glycol monomethyl ether and propylene glycol monoethyl ether.

6. The process according to claim 1, wherein the alcohol (C) is ethanol.

7. The process according to claim 1, wherein at least one alkyl alkoxysilane selected from the group consisting of methyltrimethoxysilane, methyltriethoxysilane, ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane, octadecyltriethoxysilane, phenyltrimethoxysilane, phenyltriethoxysilane, vinyltrimethoxysilane, vinyltriethoxysilane, γ-aminopropyltrimethoxysilane, γ-aminopropyltriethoxysilane, γ-glycidoxypropyltrimethoxysilane, γ-glycidoxypropyltriethoxysilane, γ-methacryloxypropyltrimethoxysilane, γ-methacryloxypropyltriethoxysilane, dimethyldimethoxysilane and dimethyldiethoxysilane, is incorporated as a modifier (E) in an amount of from 0.02 to 0.2 mol per mol of the silicon compound (A) in addition to the silicon compound (A), the silicon compound (B), the alcohol (C) and the oxalic acid (D), in the preparation of the reaction mixture.

8. The process according to claim 1, wherein at least one sol selected from the group consisting of a silica sol, an alumina sol, a titania sol, a zirconia sol, a magnesium fluoride sol and a ceria sol, is incorporated as an additive (F) to the coating fluid.

9. The process according to claim 7, wherein at least one sol selected from the group consisting of a silica sol, an alumina sol, a titania sol, a zirconia sol, a magnesium fluoride sol and a ceria sol, is incorporated as an additive (F) to the coating fluid.

10. A coating film having a refractive index of from 1.28 to 1.38 and a contact angle of water of from 90° to 115°, which is formed as adhered on a substrate surface, by preparing a reaction mixture comprising a silicon compound (A) of the following formula (1):

wherein R is a $C_{1-5}$ alkyl group, a silicon compound (B) of the following formula (2):

wherein $R^1$ is a $C_{1-5}$ alkyl group, and n is an integer of from 0 to 12, an alcohol (C) selected from the group consisting of diethylene glycol monomethyl ether, diethylene glycol monoethyl ether and an alcohol of the following formula (3):

$$R^2CH_2OH \quad (3)$$

wherein $R^2$ is a hydrogen atom, or an unsubstituted $C_{1-12}$ alkyl group or a $C_{1-12}$ alkyl group substituted with hydroxy, methoxy or ethoxy, and oxalic acid (D), in a ratio of from 0.05 to 0.43 mol of the silicon compound (B) per mol of the silicon compound (A), in a ratio of from 0.5 to 100 mol of the alcohol (C) per mol of the total alkoxy groups contained in the silicon compounds (A) and (B), and in a ratio of from 0.2 to 2 mol of the oxalic acid (D) per mol of the total alkoxy groups contained in the silicon compounds (A) and (B); heating this reaction mixture at a temperature of from 50° to 180° C. until the total amount of the silicon compounds (A) and (B) remaining in the reaction mixture becomes at most 5 mol %, while maintaining a $SiO_2$ concentration of from 0.5 to 10 wt % as calculated from silicon atoms in the reaction mixture and maintaining absence of water, to form a polysiloxane solution; then coating a coating fluid comprising the polysiloxane solution on a substrate surface to form a coating; and heat-curing the coating at a temperature of from 80° to 450° C.

11. The coating film according to claim 10, wherein the silicon compound (A) is at least one silicon compound selected from the group consisting of tetramethoxysilane, tetraethoxysilane, tetrapropoxysilane and tetrabutoxysilane.

12. The coating film according to claim 10, wherein the silicon compound (A) is at least one silicon compound selected from the group consisting of tetramethoxysilane and tetraethoxysilane.

13. The coating film according to claim 10, wherein the silicon compound (B) is at least one silicon compound selected from the group consisting of 3,3,3-trifluoropropyltrimethoxysilane, 3,3,3-trifluoropropyltriethoxysilane, 8,8,8,7,7,6,6,5,5,4,4,3,3-tridecafluorooctyltrimethoxysilane, 8,8,8,7,7,6,6,5,5,4,4,3,3-tridecafluorooctyltriethoxysilane, 10,10,10,9,9,8,8,7,7,6,6,5,5,4,4,3,3-heptadecafluorodecyltrimethoxysilane and 10,10,10,9,9,8,8,7,7,6,6,5,5,4,4,3,3-heptadecafluorodecyltriethoxysilane.

14. The coating film according to claim 10, wherein the alcohol (C) is at least one alcohol selected from the group consisting of methanol, ethanol, propanol, n-butanol, ethylene glycol monomethyl ether, ethylene glycol monoethyl ether, diethylene glycol monomethyl ether, diethylene glycol monoethyl ether, propylene glycol monomethyl ether and propylene glycol monoethyl ether.

15. The coating film according to claim 10, wherein the alcohol (C) is ethanol.

16. The coating film according to claim 10, wherein at least one alkyl alkoxysilane selected from the group consisting of methyltrimethoxysilane, methyltriethoxysilane, ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane, octadecyltriethoxysilane, phenyltrimethoxysilane, phenyltriethoxysilane, vinyltrimethoxysilane, vinyltriethoxysilane, γ-aminopropyltrimethoxysilane, γ-aminopropyltriethoxysilane, γ-glycidoxypropyltrimethoxysilane, γ-glycidoxypropyltriethoxysilane, γ-methacryloxypropyltrimethoxysilane, γ-methacryloxypropyltriethoxysilane, dimethyldimethoxysilane and dimethyldiethoxysilane, is incorporated as a modifier (E) in an amount of from 0.02 to 0.2 mol per mol of the silicon compound (A) in addition to the silicon compound (A), the silicon compound (B), the alcohol (C) and the oxalic acid (D), in the preparation of the reaction mixture.

17. The coating film according to claim 10, wherein at least one sol selected from the group consisting of a silica sol, an alumina sol, a titania sol, a zirconia sol, a magnesium fluoride sol and a ceria sol, is incorporated as an additive (F) to the coating fluid.

18. The coating film according to claim 16, wherein at least one sol selected from the group consisting of a silica sol, an alumina sol, a titania sol, a zirconia sol, a magnesium fluoride sol and a ceria sol, is incorporated as an additive (F) to the coating fluid.

* * * * *